(12) United States Patent
Zhang (10) Patent No.: US 9,088,867 B2
(45) Date of Patent: *Jul. 21, 2015

(54) LOCATION BASED RECOMMENDATION METHOD FOR MOBILE STATION CONTENT

(71) Applicant: Cellco Partnership d/b/a Verizon Wireless, Basking Ridge, NJ (US)

(72) Inventor: Shilei Zhang, Danville, CA (US)

(73) Assignee: Cellco Partnership, Basking Ridge, NJ (US)

( * ) Notice: Subject to any disclaimer, the term of this patent is extended or adjusted under 35 U.S.C. 154(b) by 277 days.

This patent is subject to a terminal disclaimer.

(21) Appl. No.: 13/863,701

(22) Filed: Apr. 16, 2013

(65) Prior Publication Data

US 2013/0231139 A1    Sep. 5, 2013

Related U.S. Application Data

(63) Continuation of application No. 13/243,597, filed on Sep. 23, 2011, now Pat. No. 8,428,622.

(51) Int. Cl.
| | |
|---|---|
| *H04W 24/00* | (2009.01) |
| *H04W 4/02* | (2009.01) |
| *H04W 4/20* | (2009.01) |
| *H04W 4/00* | (2009.01) |

(52) U.S. Cl.
CPC .............. *H04W 4/023* (2013.01); *H04W 4/20* (2013.01); *H04W 4/003* (2013.01)

(58) Field of Classification Search
CPC ........ H04W 4/023; H04W 4/20; H04W 4/003
USPC ........... 455/456.3, 414.3, 466, 517–519, 41.2
See application file for complete search history.

(56) References Cited

U.S. PATENT DOCUMENTS

| | | |
|---|---|---|
| 6,714,791 B2 | 3/2004 | Friedman |
| 6,731,940 B1 | 5/2004 | Nagendran |
| 6,912,398 B1 | 6/2005 | Domnitz |
| 8,099,109 B2 | 1/2012 | Altman et al. |
| 8,200,247 B1 | 6/2012 | Starenky et al. |

(Continued)

FOREIGN PATENT DOCUMENTS

| | | |
|---|---|---|
| EP | 2 073 498 A1 | 6/2009 |
| WO | WO 2009/083719 A1 | 7/2009 |

OTHER PUBLICATIONS

Extended European Search Report issued in European Patent Application No. 10014300.7-2413, dated Mar. 31, 2011.

(Continued)

*Primary Examiner* — Sharad Rampuria (57) ABSTRACT

A location based method of offering a recommendation of content to a user of a mobile station includes receiving information identifying a current location for the mobile station. Then, in a content usage database, records of other mobile stations that have recently been near that location are identified. For each identified record of another mobile station, content resident on an used by the other mobile station in the content usage database is identified. Then, for example, responsive to at least one inquiry received from the mobile station, a recommendation is transmitted through a wireless communications network to the mobile station of the user. The recommendation includes information about the identified content resident on and used by one or more of the other mobile stations.

20 Claims, 4 Drawing Sheets

(56) References Cited

U.S. PATENT DOCUMENTS

| | | |
|---|---|---|
| 8,428,622 B1 | 4/2013 | Zhang |
| 8,515,459 B2 | 8/2013 | Busch |
| 8,611,930 B2 | 12/2013 | Louboutin et al. |
| 8,620,376 B2 | 12/2013 | Kwon et al. |
| 8,666,376 B2 | 3/2014 | Ramer et al. |
| 8,737,691 B2 | 5/2014 | Sivaraman et al. |
| 8,831,640 B2 * | 9/2014 | Trinchero et al. .......... 455/456.3 |
| 2004/0087273 A1 | 5/2004 | Perttila et al. |
| 2004/0203863 A1 | 10/2004 | Huomo |
| 2005/0255861 A1 | 11/2005 | Wilson et al. |
| 2007/0060173 A1 | 3/2007 | Ramer et al. |
| 2008/0040329 A1 | 2/2008 | Cussen et al. |
| 2009/0157632 A1 | 6/2009 | Ryu et al. |
| 2009/0163183 A1 | 6/2009 | O'Donoghue et al. |
| 2010/0004004 A1 | 1/2010 | Browne-Swinburne et al. |
| 2010/0063854 A1 | 3/2010 | Purvis et al. |
| 2010/0331016 A1 | 12/2010 | Dutton et al. |
| 2011/0105150 A1 | 5/2011 | Moon et al. |
| 2011/0238751 A1 | 9/2011 | Belimpasakis et al. |
| 2012/0009956 A1 | 1/2012 | Zhang et al. |
| 2012/0021770 A1 | 1/2012 | Naqvi |
| 2012/0190386 A1 | 7/2012 | Anderson |
| 2013/0035114 A1 | 2/2013 | Holden et al. |
| 2013/0137464 A1 | 5/2013 | Kramer et al. |
| 2013/0337838 A1 | 12/2013 | Kolodziej |
| 2013/0337841 A1 | 12/2013 | Johnson |
| 2014/0057657 A1 | 2/2014 | Manber et al. |
| 2014/0066098 A1 | 3/2014 | Stern et al. |

OTHER PUBLICATIONS

Tadanobu Tsunoda et al., "Locating Based Query Routing for Distributed Spatial Data in Mobile Ad Hoc Network," Information and Telecommunication Technologies, 2008, 7$^{th}$ Asia-Pacific Symposium on, IEEE, Apr. 2008, pp. 241-246, XP031350283.

Entire prosecution history of U.S. Appl. No. 13/243,597, filed Sep. 23, 2011, entitled "Location Based Recommendation Method for Mobile Station Content."

* cited by examiner

LOCATION BASED RECOMMENDATION METHOD FOR MOBILE STATION CONTENT

CROSS-REFERENCE TO RELATED APPLICATIONS

This application is a continuation of U.S. patent application Ser. No. 13/243,597, filed Sep. 23, 2011, the contents of which is incorporated herein by reference.

BACKGROUND

In recent years, mobile communication services have expanded and increased in popularity around the world. Many advanced networks offer wireless mobile communication service for voice calls, mobile messaging services (e.g., text and/or multimedia) and data communications. The data services, for example, enable surfing the world wide web, e.g., via a browser. The speeds of the data communications services have steadily increased as service providers have migrated the networks to newer generation technologies with broadband data communication capabilities, and the mobile stations have steadily advanced to take advantage of the new network technologies. The data communication capabilities of the mobile stations and the broadband data communication services offered by the networks enable users to perform more and more tasks from their mobile stations.

Shopping has also evolved with the evolution to telecommunications technologies. On-line shopping is now commonplace, and increasingly, users can do their on-line shopping using their mobile stations. Although on-line shopping can be for traditional goods or services, on-line shopping from a mobile station is often related to shopping for content for downloading to the mobile station. Examples of mobile station content items include, without limitation, media, games, messaging, social networks, stores, and any other applications or information for use on or with a mobile station.

Mobile application stores traditionally provide the following options to allow a user to discover applications: 1) search by keywords, 2) browse categories such as Games, Business, Lifestyle, Shopping, Travel & Local, etc., or sub-categories such as Top Paid, Top Free, recent arrival, 3) recommendations, based on (a) the store's pick, (b) the user's download history, or (c) Context Relevance. Applications are then listed based on the number of downloads.

When traveling, relocating, or otherwise exploring an unfamiliar location, relevant mobile station content may be difficult to find. At least some content may be of particular interest to the local community, with minimal popularity outside the area. For example, a parking spot finder in San Francisco, or a Chicago transit schedule would likely be known to and used by the local community and may be of interest to travelers visiting those cities. However, visitors may not know or think about the availability of such applications. Moreover, it may be difficult to ascertain quickly the mobile station content items that are of particular interest to those in the vicinity or anticipated vicinity of the user, and thus might also be of interest to the user.

Hence, a need exists for improved technologies for distributing recommendations, for example, which provide a user with an indication of mobile station content that is popular with nearby users of mobile stations.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various methods disclosed herein relate to providing recommendation of content to a user of a mobile station. By using the device's location, a new dimension may be provided to application stores for users to discover mobile applications. A new category or subcategory can be provided in the store so applications are listed based on the number of their nearby users. Thus, the user or application store client can pick from applications that have the most users in the vicinity, the highest ratings by users in the vicinity, the most frequent use in the vicinity. Here vicinity, which may be set by the user, can be a zip code, city or country, or a set distance from the current location of the mobile station of the user. The vicinity may also be an anticipated vicinity or expected future location that the user specifies by dropping a pin on a map, entering a latitude and longitude, entering an address, or otherwise indicating. Also, the number of users can be determined based on a user-selected (or otherwise predetermined) time period such as an hour, a day, a week, or a month. In some embodiments, the time period may be instantaneous, providing information at the time of the request. Alternatively, the time period may be cumulative, providing information over a length of time preceding the request.

Regional applications, location-aware applications, or hyper local applications are increasing in popularity, and usage of mobile applications is increasing. With these two trends in mind, adding location to application discovery can create a virtuous circle between the end user, the application store and the developer. The end user can discover applications that are most relevant to their needs, for example, looking for a parking space finder application in San Francisco. The application store can get more users to download applications because they can discover the ones they need faster— faster discovery likely results in more downloads. The developer can benefit because their application has a fair shot at being discovered if they are good at a local level—the better they are at local applications, the more users use that application, and the more likely the application will be discovered.

One exemplary method involves the user activating an application store and selecting a menu entry indicating nearby mobile station content (e.g., "apps around me"). The user also indicates a set distance (e.g., "within one mile of my current location"), and a set time frame (e.g., "within the last hour"). An application store client on the user's mobile station obtains the current location of the mobile station and sends the location, along with the set distance and set time frame, to an application store server. The application store server returns, to the application store client, information about applications used by mobile stations that were recently (e.g., within the last hour) in the vicinity of (e.g., within one mile) the user's mobile station. The vicinity may be a fixed location, set at a given point in time, or the vicinity may be dynamic, allowing for updates as the mobile station moves from point to point. The application store client then displays a listing of applications for the user to select for downloading. Prior to the user selecting the menu entry, probes gather information from mobile stations, including location, time, and content present. This information is stored in a database for use when the user activates the application store and selects the menu.

From the service provider's perspective, an exemplary method involves identifying the current location of the mobile station of the user. Then, in an application usage database, records of other mobile stations present within a set distance of the location within a set time frame are identified. For each of the identified records, applications on the corresponding mobile station are identified in the application usage database. Then, information about the usage of applications is transmitted through a network to the user's mobile station.

In another exemplary method, the current location of the mobile station of the user is obtained by an application store server, along with a time frame restriction and a distance restriction. The location, time frame restriction, and the distance restriction are transmitted to an application usage server. The application usage server determines a list of software applications used by mobile stations present within the time frame restriction and within the distance restriction of the current location of the mobile station. The application usage server then transmits the list of software applications to the application store server. The application store server receives and filters the list of software applications before transmitting the filtered list of software applications for display on the mobile station of the user.

As a result of the disclosed methods, a user can learn about mobile station content items, such as software applications or other content, resident on and used by other nearby users. Further, developers of mobile station content items may benefit from increased local exposure, when geographic exposure is absent, either because of the nature of the content or because of the limited exposure generally inherent in a new content item.

Other concepts relate to unique systems and software for implementing the techniques to recommend mobile station related content based on the content used by another nearby mobile station user.

Figure 1:
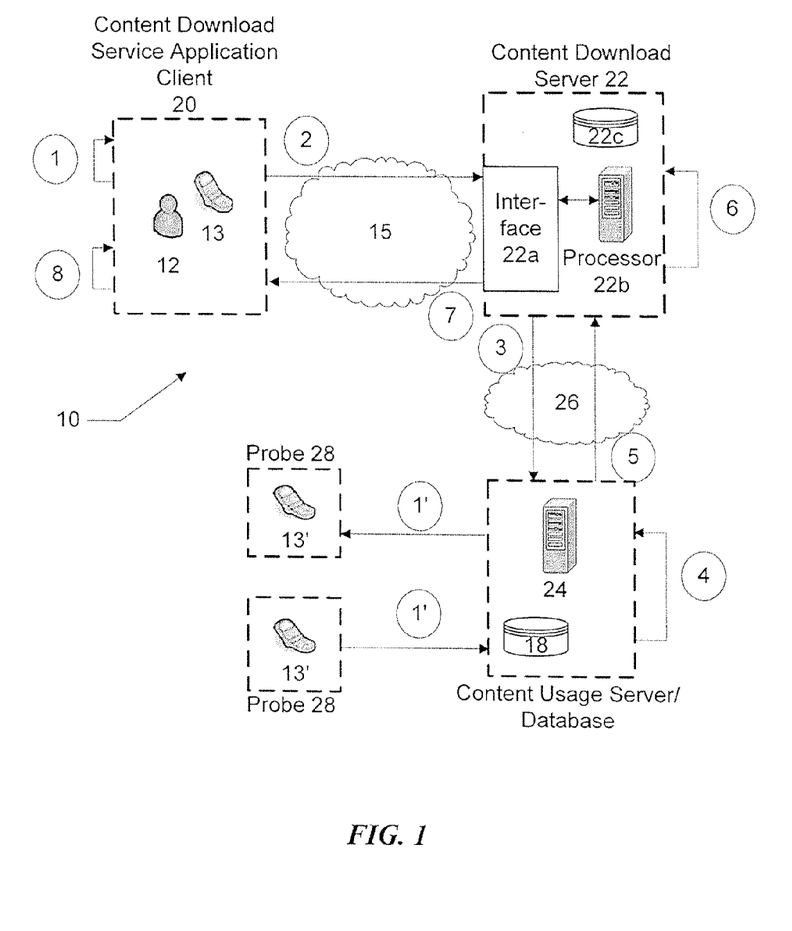
FIG. 1 is a high-level functional block diagram of an exemplary system for implementing a location based method, for example, for providing recommendations about mobile station content for downloading to a mobile station.

Reference now is made in detail to the examples illustrated in the accompanying drawings and discussed below. FIG. 1 illustrates an exemplary system 10 for implementing a location based method. System 10 offers a recommendation of content to a user 12 of a mobile station 13. The system 10 has an interface 22a for communications with the mobile station 13 via a wireless communication network 15. The interface 22a can be part of a content download server 22 (e.g., an application store server). The system 10 also has at least one processing 22b coupled to the interface 22a, with at least one storage device 22c accessible to the processor 22b. The system 10 has a content usage database 18 (e.g., an application usage database), associated with a content usage server 24. The content usage database 18 includes records for other mobile stations 13' containing information identifying content transmitted, transmission time, and location of the other mobile stations 13' for content delivered to particular ones of the respective other mobile stations 13'. Such content may include software applications, wallpaper, ringtones, or other content.

Execution of the programming by the processor 22b configures the system 10 to perform functions. The functions include identifying a current location of the mobile station 13, as illustrated at step 2 below. The functions further include identifying, in the content usage database 18, the records of the other mobile stations 13' that have been within a set distance of the identified location at any time within a set time frame, illustrated at step 4 below. The functions also include identifying, for each identified record of another mobile station 13', content resident on and used by the other mobile station 13' in the content usage database 18, also illustrated at step 4 below. Responsive to at least one inquiry received from the mobile station 13, the functions include transmitting, through the wireless communications network 15 to the mobile station 13 of the user 12, a recommendation including information about the identified content resident on and used by one or more of the other mobile stations 13', illustrated generally at steps 7 and 8 below. The recommendation may include, for example, presentation of the most popular content within a set distance and a set time frame of the current location of the mobile station 13.

In one example, the content download server 22 is configured to perform functions including functions to identify a current location of the mobile station 13 of the user 12, illustrated at step 2 below. The content download server 22 is also configured to perform functions to receive a time frame restriction and a distance restriction via manual actuation of the user 12 of the mobile station 13, also illustrated at step 2 below. In this example, the content download server 22 is configured to transmit the location, the time frame restriction, and the distance restriction to the content usage server 24, as illustrated at step 3 below, and receive, from the content usage server 24, a list of content resident on and used by other mobile stations 13' present within the time frame restriction and within the distance restriction of the identified location, as illustrated at step 5 below. The content download server 22 is also configured to perform functions to transmit the list of content for display on the mobile station 13 of the user 12, as illustrated at step 7 below.

In another example, which may be used in conjunction with the previous example, the content usage server 24 is configured to perform functions including functions to obtain the location, the time frame restriction, and the distance restriction from the content download server 22, as illustrated step 3 below. The content usage server 24 is also configured to refer to the content usage database 18 to create the list of content resident on and used by the other mobile stations 13' deemed to be present within the time frame restriction and within the distance restriction of the identified location. The content usage server 24 can also be configured to cache results for future requests for the same region. The content usage database 18 is populated by probes 28 that transmit location, time, and content information from the other mobile stations 13', as illustrated at step 1' below. Probes 28 may be built into an application and collect the location and a unique identification, such as mobile directory number from mobile stations 13' and submit the information to the content usage server 24 each time the application is used. Probes 28 may be standalone, or probes 28 may coexist with other libraries used by the application. The content usage server 24 of this example is also configured to transmit to the content download server 22, the list of content resident on and used by the other mobile stations 13' present within the time frame restriction and within the distance restriction of the identified location, as illustrated at step 5 below.

The content download service application client 20 can be for execution on the mobile station 13. The content download service application client 20 shows the user 12 the option to view content on other mobile stations 13' in the vicinity of mobile station 13. The content download service application client 20 collects the time frame and location restrictions or preferences from the user 12 and determines the current location of the mobile station 13. The content download service application client 20 also retrieves and displays the list of content from the content download server 22 by submitting the user's location and time frame preferences.

The probes 28 may be a standalone application, submitting location of mobile stations 13 and application usage information to the content usage server 22 and/or the content usage database 18. Alternative, the probes 28 may be built into an application that registers itself with the content usage server 22 and/or the content usage database 18 periodically when in use, or upon startup. In other embodiments, the probes 28 may piggy back on an existing function. For example, if an application needs to register itself with a server when it obtains a location, the associated registration information residing on the server may be shared with the content usage server 22 and/or the content usage database 18, allowing the content usage server 22 and/or the content usage database 18 to be effectively added to that server.

Mobile station 13 can take the form of portable handsets, smart-phones or personal digital assistants, although they may be implemented in ether form factors. Program applications can be configured to execute on many different types of mobile stations 13. For example, a mobile station application can be written to execute on a binary runtime environment for BREW-based mobile station, a Windows Mobile based mobile station, Android, I-Phone, Java Mobile, or RIM based mobile station such as a BlackBerry or the like. Some of these types of devices can employ a multi-tasking operating system.

Those skilled in the art presumably are familiar with the structure, programming and operations of the various types of mobile stations.

Figure 2:
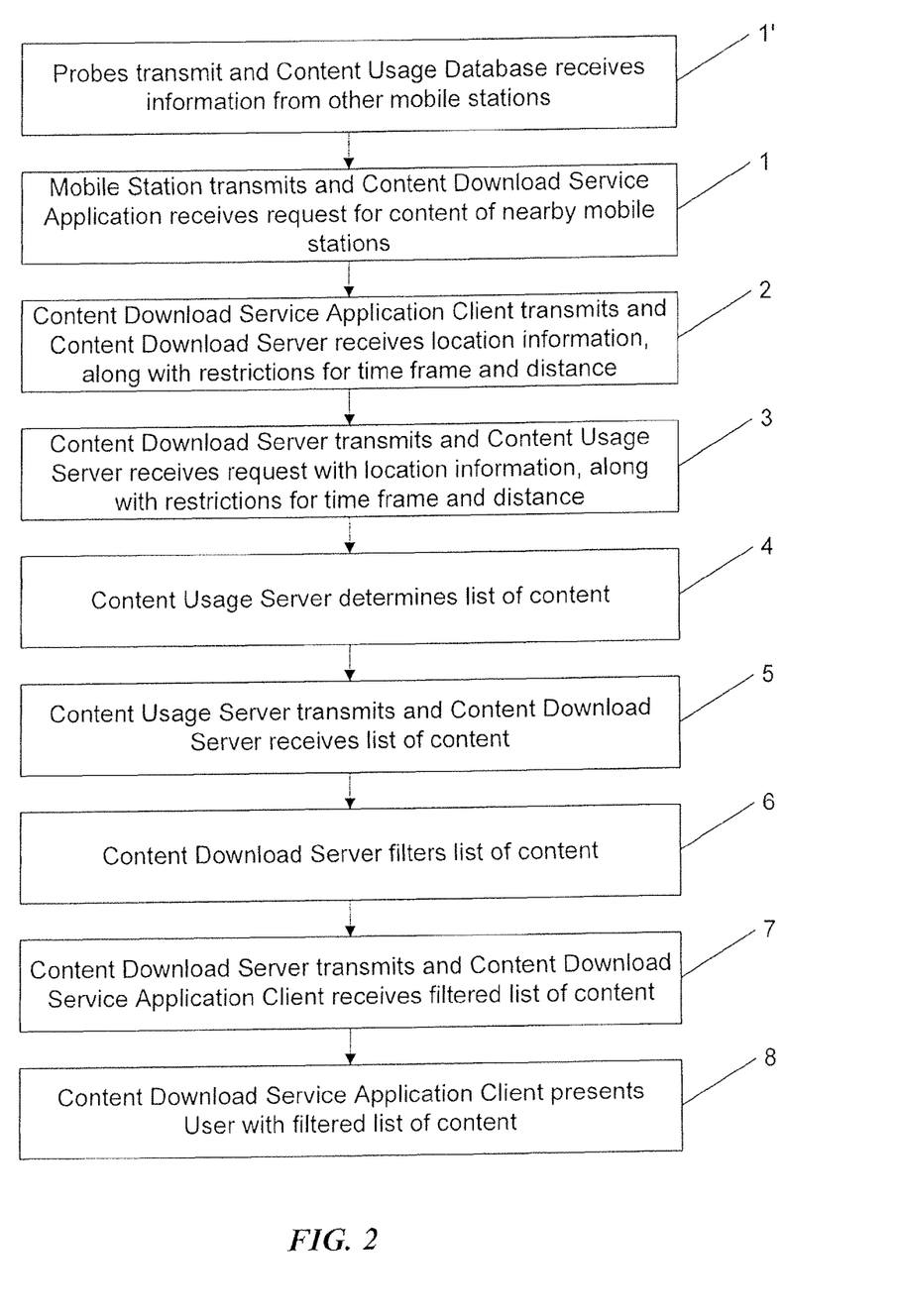
FIG. 2 is a flow chart of an exemplary location based method of offering recommendations to a user of a mobile station.

Referring now to FIG. 2, with step reference numerals also present in circles in FIG. 1, a location based method of offering a recommendation of content to the user 12 of the mobile station 13 is shown. At step 1, the user 12 requests the system 10 to show content (e.g., applications) present on mobile stations 13' of others in the vicinity of the user 12, using a content download service application client 20 (e.g., an application store client). The request may be for content consumed by nearby mobile stations 13' with restrictions such as time frame and distance. Prior to, simultaneous with, or after the request by the user 12, at step 1', content probes 28 submit information from the other mobile stations 13' to the content usage database 18. The probes 28 may be triggered when an application is activated, periodically via a library in the calling application, or at some other predetermined time. Such information includes location information and unique identifiers for each of the other mobile stations 13'. The unique identifiers may provide an indication of the application and/or the user, allowing differentiation between one user launching the application multiple times and multiple users launching the application. Step 1' may also include recording in the content usage database 18, in association with locations of each of the other mobile stations 13', identification of the time at which the mobile stations 13' were at each location. Step 1' may further include recording, in the content usage database 18, and in association with locations of the other mobile stations 13', identifications of content resident on and used by the other mobile stations 13'. Thus, the content usage database 18 maintains a record of which content is on a particular other mobile station 13', and where the other mobile station 13' is, or whether it is in the vicinity, at a given time. The probes 28 may provide information periodically from other mobile stations 13' of users who have agreed to share information. The users may agree to share information via opting in explicitly, opting in implicitly as part of a download agreement, opting in when an application is launched, or otherwise. Thus, information of the other mobile stations 13' may be updated hourly, every 30 minutes, or at some other set interval. Alternatively, the information of the other mobile stations 13' may be updated only when one of the variables changes. For example, an update may be provided when location of the other mobile station 13' changes (i.e., a new location for the other mobile station 13' is recorded), when content is changed (e.g., an application is updated), or upon another triggering event.

At step 2, the content download service application client 20 sends location information for the mobile station 13 of the user 12, along with restrictions for time frame and distance, to the content download server 22. Before step 3, a time frame restriction and a distance restriction are provided, either explicitly by the user, or otherwise. In some instances, the user 12 may enter a time frame restriction and/or a distance restriction into the mobile station 13 with each inquiry. Alternatively, the user 12 may enter a time frame restriction and/or a distance restriction into the mobile station 13 once, at the time of the first inquiry. In some instances, the user 12 may not enter a time frame restriction or a distance restriction at all, but instead may use a preset or default setting for either or both. For example, "show me applications used within once mile of my current location in the past 4 hours." Some adaptations may be provided automatically, such as adjustment of time to local time.

At step 3, after receiving time frame and distance restrictions from the mobile station 13, the content download server 22 sends a request with location information for the mobile station 13 of the user 12, along with restrictions for time frame and distance, through a data communication network 26 (e.g., a private/secure network, for IP communications between servers) to a content usage server 24 (e.g., an application usage server).

At step 4, the content usage server 24 determines a list of content based on the location information and the restrictions, and cached results stored in the content usage database 18 in conjunction with a previous request for the same region. For example, in a densely populated area, multiple requests may be sent at approximately the same time with identical or similar location information and identical or similar restrictions. Caching may eliminate the need to recalculate overlapping results. Step 4 may include identifying, in the content usage database 18, the records of the other mobile stations 13' that have been within a set distance of the identified location at any time within a set time frame. The identification of step 4 may be performed after receiving the set distance and/or the set time frame. Step 4 may further include identifying, for each identified record of another mobile station 13', content resident on and used by the other mobile station 13' in the content usage database 18. The information about the content may include the number of other mobile stations 13' that have used a particular software application. The information about the content may additionally or alternatively include a difference in distance and/or a difference in time between the mobile station 13 of the user 12 and one or more other mobile stations 13' that have used a particular software application. Information about distance between the mobile station 13 and the mobile stations 13' may allow the user 12 to select applications of interest in a particular portion of the set distance without modifying the set distance. For example, a weather forecast application may be the most popular application in the set distance, but a menu application may be very popular in the immediate vicinity of the restaurant for which the menu application was created. If the user 12 were nearby and discovered the popularity of the menu application, the user 12 might be interested in the application and the restaurant. Likewise, information about time lapse between the collection of information about mobile stations 13' and the current location of the mobile station 13 may allow the user 12 to select applications of interest at a particular time in the set time frame. For example, the menu application may become suddenly less popular when the restaurant closes, even if the closing time was within the set time frame. Thus, the user 12 may discover weaning popularity and decide to go elsewhere. With information on difference in distance and/or difference in time, the user 12 may determine applications useful at an even more exact time and place than the set distance and set time frame would otherwise permit. Popularity may be indicated either by display of actual number of users, by a percentage of users, or by another indicator.

At step 5, the content usage server 24 returns the list of content to the content download server 22. After receiving a list of content, the content download server 22 then filters the list at step 6. Thus, the information about the content may be filtered before it is transmitted to the mobile station 13 or the user 12. Filtering the information may include comparing a list with information identifying the identified content resident and used by on one or more of the other mobile stations 13' to information identifying content already on the mobile station 13 of the user 12. Thus, only new content would be resented to the user 12. Various categories may provide the user with choices regarding the filtering. For example, a "business" category may have "used around me," "new," "most downloaded," or other tabs, allowing the client to manage the presentation of filtered results. Other filtering may include elimination of adult content (age restriction), elimination of content exceeding a preset cost limit, other reduction in a list of content as desired by the user 12 or other interested party (such as a parent of the user 12), content categories, user preset preferences, or other parameters.

At step 7, the content download server 22 returns a filtered list of content to the content download service application client 20, which, at step 8 transmits or otherwise presents the list to the mobile station 13 of the user 12 as content in use in the vicinity of the user 12. The transmission of the filtered list may include transmitting only information about content not already on the mobile station 13 of the user 12, as identified by the step of filtering.

In another example (not illustrated), the content download server 22 and the content usage server 24 can be merged into one component, in which case, steps 3 and 5 are omitted and steps 4 and 6 are performed by the single device.

Figure 3:
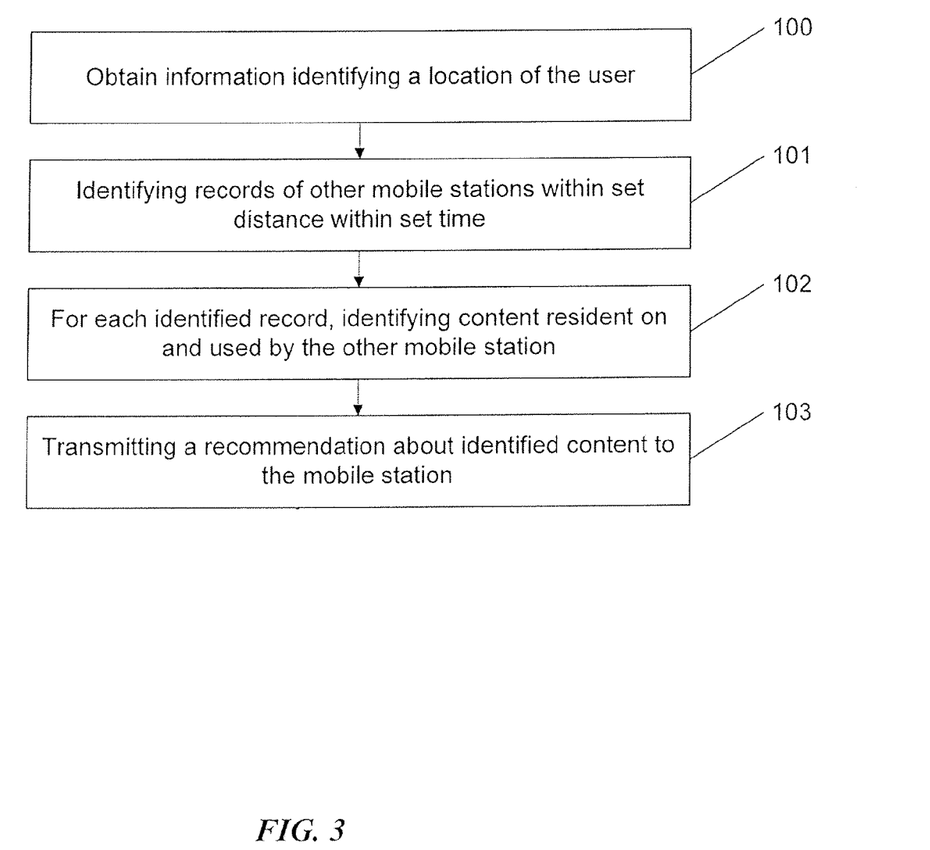
FIG. 3 is a flow chart of another exemplary location based method of offering recommendations to a user of a mobile station.

In a particular example, illustrated in FIG. 3, a location based method of offering a recommendation of content to the user 12 of the mobile station 13 includes identifying a current location of the mobile station 13 of the user 12, illustrated at step 100. To obtain information identifying the current location of the mobile station 13 of the user 12, a location sensing system may be configured to sense the current location of the mobile station 13. The location sensing system may be of any type. For example, it may include a Global Positioning System (GPS) chip set configured to determine the geographic location of the mobile station 13 based on positioning signals from global satellites. The location sensing system may, in addition or instead, include an architecture that uses both GPS as well as network elements to determine position, referred to as Assisted GPS (AGPS). The location sensing system can, in addition or instead, use cell tower triangulation to determine position based on the nearest cell tower identification.

At step 101, in the content usage database 18, records of one or more other mobile stations 13' are identified. The identified records are those records of other mobile stations 13' that have been within a set distance of the identified location at any time within a set time frame. At step 102, for each identified record of another mobile station 13' meeting the requirements set forth in step 101, the content resident on and used by the other mobile station 13' is identified in the content usage database 18. At step 103, responsive to at least one inquiry received from the mobile station 13, a recommendation is transmitted through the wireless communication network 15 to the mobile station 13 of the user 12. The recommendation includes information about the identified content resident on and used by one or more of the other mobile stations 13'.

While the disclosure describes methods of showing applications based on the number of user's around a location, potentially the application store can combine this information into their existing recommendation algorithms, as a result, applications with user numbers in a location become an input parameter for a recommendation engine. Thus, the recommendation may be displayed on the mobile station 13 as the most popular downloads listed in order of popularity, or in another order such as by price, by user rating, by popularity growth rate, by release date, or by any other sorting parameter.

It is believed that the combination of collecting application usage data from devices, then dynamically determining a list of applications in a region based on number of users, and finally applying this data to promote applications in the application store provides numerous advantages.

As shown by the above discussion, functions relating to the enhanced recommendations of applications or other mobile station content items may be implemented on computer connected for data communication via the components of a packet data network, operating as the various servers and/or client mobile stations as shown in FIG. 1. Although special purpose devices may be used, such devices also may be implemented using one or more hardware platforms intended to represent a general class of data processing device commonly used to run "server" programming so as to implement the content recommendation related functions discussed above.

As known in the data processing and communications arts, a general-purpose computer typically comprises a central processor or other processing device, an internal communication bus, various types of memory or storage medial (RAM, ROM, EEPROM, cache memory, disk drives etc.) for code and data storage, and one or more network interface cards or ports for communication purposes. The software functionalities involve programming, including executable code as well as associated stored data, e.g., files used for the location based recommendation. The software code is executable by the general-purpose computer that functions as a server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for location based recommendations, in essentially the manner performed in the implementations discussed and illustrated herein.

Figures 4, 5:
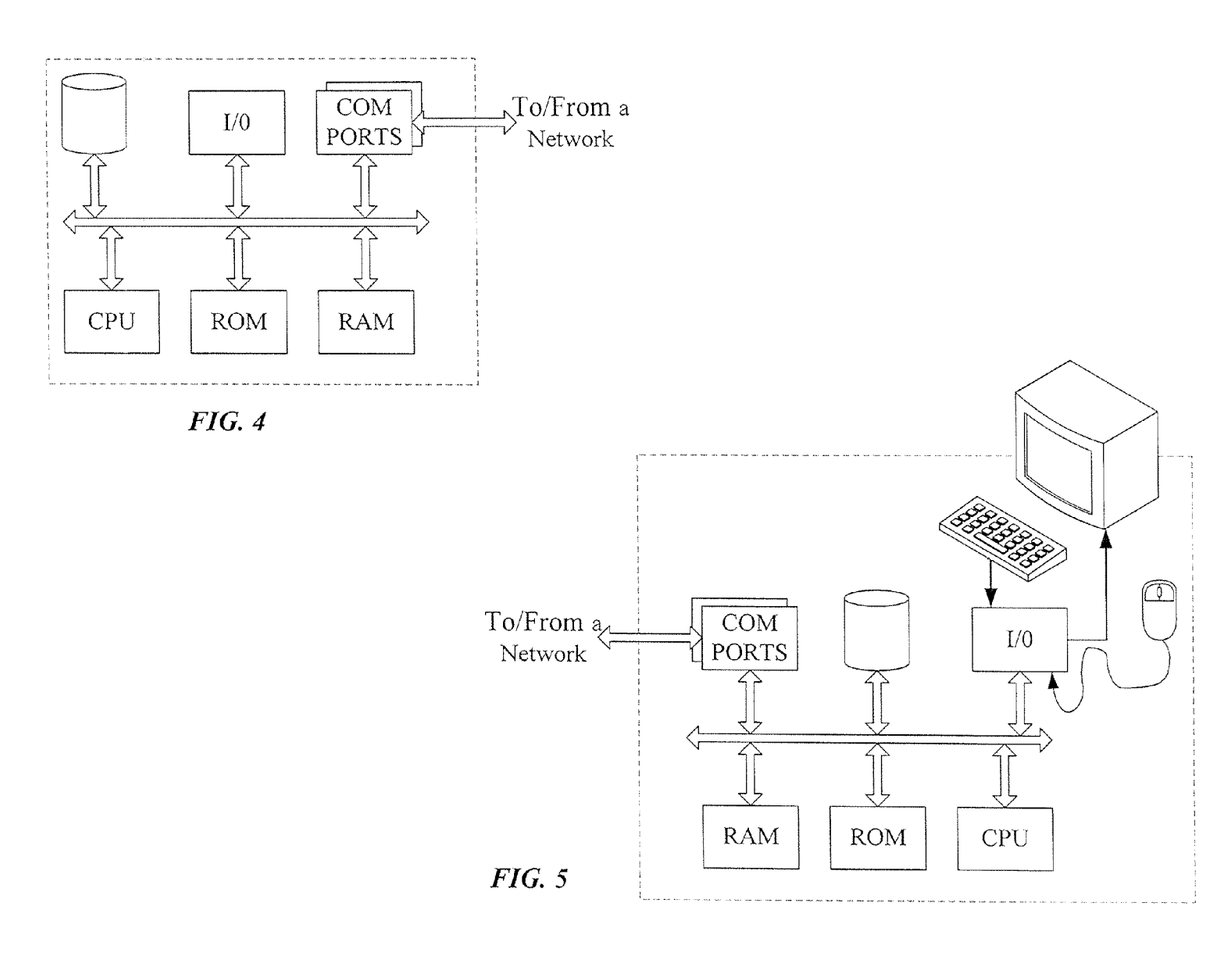
FIG. 4 is a simplified functional block diagram of a computer that may be configured as a host or server.
FIG. 5 is a simplified functional block diagram of a personal computer or other work station or terminal device.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or mere processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of offering location based recommendations to a user of the mobile station outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, or example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the aspects shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that ate set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

Appendix: Acronym List

The description above has used a large number of acronyms to refer to various services, messages and system components. Although generally known, use of several of these acronyms is not strictly standardized in the art. For the convenience of the reader, the following list correlates terms to acronyms, as used by way of example in the detailed description above.

AGPS—Assisted Global Positioning System
BREW—Binary Runtime Environment for Mobile
CD-ROM—Compact Disk Read Only Memory
CPU—Central Processing Unit
DVD—Digital Video Disk
DVD-ROM—Digital video Disk Read Only Memory
EPROM—Erasable Programmable Read Only Memory
EEPROM—Electrically Erasable Programmable Read Only Memory
FLASH-EPROM—Flash Erasable Programmable Read Only Memory
GPS—Global Positioning System
IP—Internet Protocol
IR—Infrared
PROM—Programmable Read Only Memory
RAM—Random Access Memory
RF—Radio Frequency
RIM—Research In Motion
ROM—Read Only Memory

What is claimed is:

1. A method comprising the steps of:
identifying a location for a mobile station;
identifying, in a content usage database, records of one or more other mobile stations that have been within a set distance of the identified location at any time within a set time frame;
from each identified record of another mobile station, identifying content resident on the other mobile station; and
transmitting through a wireless communications network to the mobile station a recommendation for a user of the mobile station comprising information about the identified content resident on the one or more other mobile stations.

2. The method of claim 1, comprising the step of:
recording in the content usage database, in association with locations of each of the other mobile stations, identification of the time at which that other mobile station was at each location; and
recording in the content usage database, in association with the location of that other mobile station, identifications of content resident on and used at that other mobile station.

3. The method of claim 1, wherein the information about the identified content includes:
identification of a particular software application as content resident on the one or more other mobile stations; and
the number of mobile stations that have used the particular software application within the set distance of the identified location at any time within the set time frame.

4. The method of claim 3, wherein the information about the identified content includes a difference in distance and time between the mobile station of the user and the one or more of the other mobile stations that have used the particular software application.

5. The method of claim 1, wherein the set distance and set time frame are specified via manual actuation of the mobile station of the user.

6. The method of claim 1, comprising the step of filtering a list comprising the information about the content before transmitting the information about the content to the mobile station of the user.

7. The method of claim 6, wherein:
the step of filtering the information comprises comparing information identifying the identified content resident on one or more of the other mobile stations to information identifying content already on the mobile station of the user, and
the transmitting step comprises transmitting only information about content not already on the mobile station of the user as identified by the step of filtering.

8. The method of claim 1, further comprising the steps of:
receiving an inquiry from the mobile station of the user, the inquiry including a time frame restriction and a distance restriction; and
based on the identified location, the time frame restriction, and the distance restriction, determining from the content usage database a list of software applications used by the other mobile stations present within the time frame restriction and within the distance restriction of the identified location;
wherein the step of transmitting the recommendation comprises transmitting the list of software applications for display on the mobile station of the user.

9. The method of claim 8, wherein the identified location is a location manually specified by the user of the mobile device.

10. The method of claim 8, wherein the distance restriction and the time frame restriction are responsive to a manual actuation of the mobile device of the user.

11. The method of claim 1, wherein the recommendation lists content, for display on the mobile station, in order of popularity of usage on the one or more other mobile stations.

12. The method of claim 1, wherein the recommendation lists content, for display on the mobile station, according to a recommendation algorithm using a sorting parameter and incorporating the information about the identified content resident on one or more of the other mobile stations.

13. A method comprising steps of:
receiving probe gathered information from mobile stations identifying locations of the mobile stations and content resident on and used on the mobile stations at the locations;
from the probe gathered information, creating records in a content usage database associating locations of the mobile stations with content resident on and used by the other mobile stations;
receiving, through a wireless communications network, an inquiry from one mobile station identifying a location;
in response to receiving the inquiry, determining, from the records in the content usage database, a list of content resident and used on other mobile stations within a set distance of the identified location; and
transmitting the list of content through the wireless communications network to the one mobile station.

14. The method of claim 13, wherein the inquiry includes data identifying a distance restriction for use as the set distance, the distance restriction being responsive to a manual actuation of the mobile device of the user.

15. A method comprising steps of:
identifying a location for a user's mobile station;
receiving a user input of a distance restriction and a time frame via the user's mobile device;
transmitting an inquiry, from the user's mobile station though a wireless communications network, the inquiry including identification of the location, the distance restriction and the time frame;
responsive to the inquiry, receiving at the mobile station through the wireless communications network, a recommendation for the user identifying content resident and used on one or more other mobile stations within the distance restriction of the identified location within the time frame; and
providing the received recommendation to the user.

16. The method of claim 15, wherein the identified location is a current location of the user's mobile station.

17. The method of claim 15, wherein the identified location is received via a user input of the identified location.

18. The method of claim 15, wherein the identified content resident and used on one or more other mobile stations comprises software applications not resident on the user's mobile station.

19. The method of claim 18, wherein the recommendation lists the software applications based on the number of users near the identified location.

20. The method of claim 18, wherein the step of providing the received recommendation to the user comprises enabling the user to pick content based on at least one of: most users in the vicinity of the identified location, highest ratings by users in the vicinity, or most frequent use in the vicinity of the identified location.

\* \* \* \* \*